(No Model.)
C. T. VIAU.
CHOCOLATE COATING APPARATUS.
No. 570,575. Patented Nov. 3, 1896.
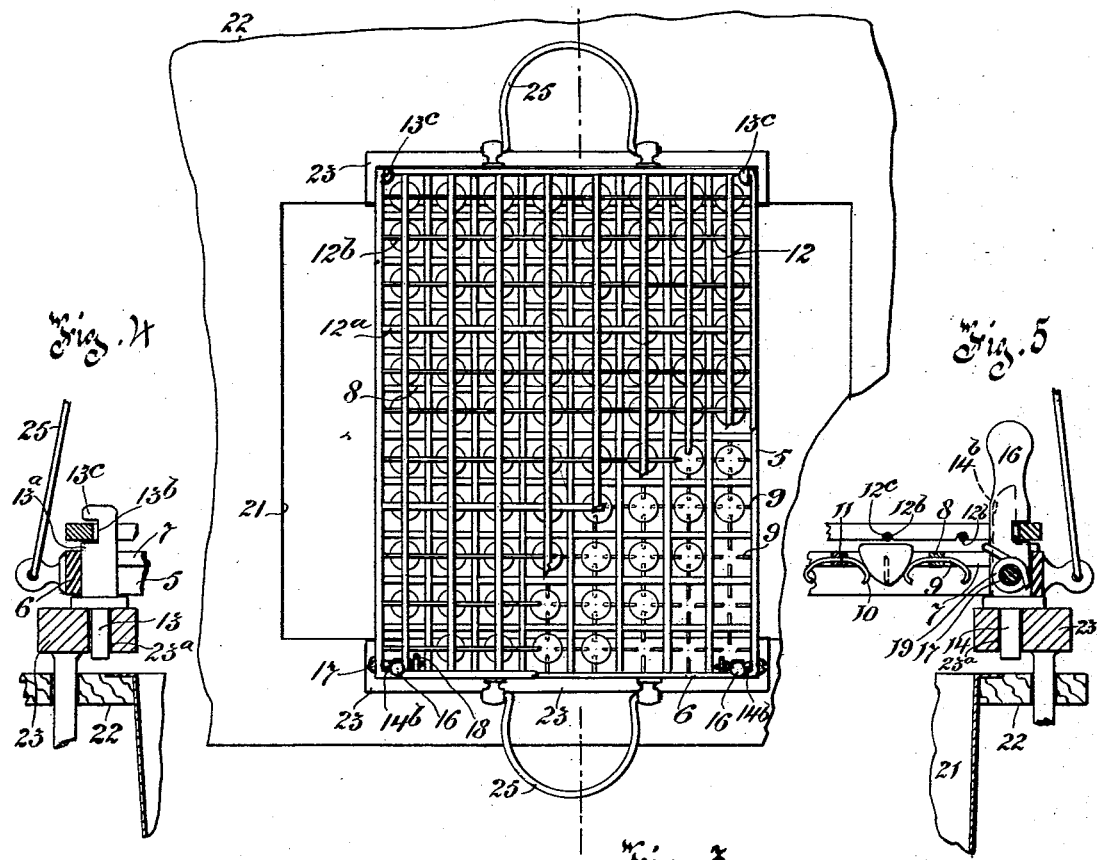
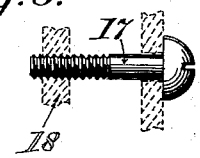
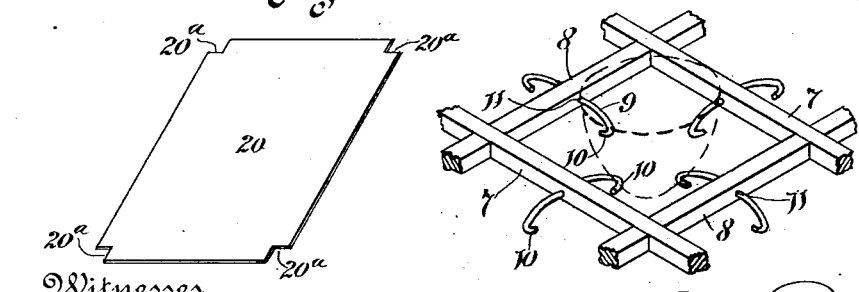

UNITED STATES PATENT OFFICE.

CHARLES THEODORE VIAU, OF MONTREAL, CANADA.

CHOCOLATE-COATING APPARATUS.

SPECIFICATION forming part of Letters Patent No. 570,575, dated November 3, 1896.

Application filed November 18, 1895. Serial No. 569,368. (No model.)

*To all whom it may concern:*

Be it known that I, CHARLES THEODORE VIAU, of the city of Montreal, in the district of Montreal and Province of Quebec, Canada, have invented certain new and useful Improvements in Chocolate-Coating Apparatus; and I do hereby declare that the following is a full, clear, and exact description of the same.

My invention, although relating particularly to the coating of "cream" drops with chocolate, is equally applicable in any like kind of work, such, for instance, as coating gelatinous or gum drops with sugar, &c.; and it has for its object to produce an apparatus that will be novel, more simple in operation, more durable, less costly to construct, and produce a better-finished article in a much shorter space of time than the apparatus and machines that have been in use heretofore, and, furthermore, a machine that does not necessarily require the use of steam or other power other than manual in the operation thereof, although, if desired, steam-power may be applied.

My invention may be said to consist briefly, first, in a special construction of the dipping-frame, whereby the contact of the cream drop therewith will be confined to a small number of minute supporting-points instead of to the extensive surface of an encircling band, as heretofore, and, secondly, in the construction of the cover and the tray receiving the finished drops and in the special arrangement of the means for agitating the carrier after dipping and the particular combination and arrangement of these several parts.

For full comprehension, however, of the invention reference must be had to the accompanying drawings, forming a part of this specification, in which like symbols indicate the same parts, and wherein—

Figure 1 is a plan view of my improved dipping-frame in place upon the agitator over the chocolate-dipping trough and with the cover in place; Fig. 2, a detail perspective view of the tray reduced in size; Fig. 3, an enlarged detail perspective view of one of the holders of the dipping-frame; Fig. 4, an enlarged detail elevation of one of the supporting legs or posts; Fig. 5, a similar view of one of the latches, and Fig. 6 a detail enlarged view of one of the screw-threaded bolts used in the construction of my improved carrier.

The dipping-frame section in the main preferably consists of an oblong rectangular frame made up of side and end bars 5 5 and 6 6, respectively, and the space inclosed by the frame is divided into any desired number of subdivisions or spaces by longitudinal and transverse dividing-bars 7 and 8. From these longitudinal and transverse dividing-bars project a series of supports, preferably one from each side of each of the subdivisions or spaces formed by the dividing-bars 7 and 8, and these supports are preferably formed and supported in the following manner: Each support consists of a slightly-curved short length of wire 9, having its projecting end turned downward, as at 10 10, and two of such supports may be formed of a single piece of wire having its ends curved inward toward one another and passed through a perforation 11 in the carrying-bar therefor, in which perforation it is set rigidly about midway of its length with its convex side uppermost, thus forming two supports, one to project on either side of the carrying-bar.

A number of the supports just described will provide holders for supporting the drops to be dipped, the supporting-surface of which will be exceedingly diminutive and thereby insure the coating of the entire "drop" with chocolate or any other coating substance in which it may be dipped.

The drops to be dipped are placed one in each holder, resting upon the supports or fingers 9 thereof, and in order to guard against their floating to the surface when immersed in the liquid chocolate or whatever substance they are to be coated with I provide a cover preferably constructed as follows:

An oblong rectangular frame corresponding in length and breadth to the dipping-frame has longitudinal bars 12 and transverse bracing-bars 12ª, the longitudinal bars being set such a distance apart that they will cross the centers of the holders of the carrier, while auxiliary bars can be added, if desired, by stretching a series of lengths 12ᵇ of wire transversely across the longitudinal bars 12 and securing such auxiliary bars to such longitudinals in order to be flush with the bearing-surface thereof by setting them in grooves 12ᶜ and securing them therein by soldering or the like.

The cover is held in place slightly above the dipping-frame by means of corner-posts 13 13 and 14 14, carried by such dipping-frame, the ones 13 13 extending upward sufficiently to provide shoulders 13ᵃ, a recess 13ᵇ, and an overhanging portion 13ᶜ, the recess 13ᵇ being of sufficient width to accommodate the end frame-bar of the cover. The other posts 14 14 extend upward only a sufficient distance to provide shoulders 14ᵃ and a localizing portion 14ᵇ, the lower end of each of these posts 13 13 and 14 14 being of sufficient length to support the dipping-frame a short distance above the table or on whatever it may be set to be filled.

A pair of spring-actuated latches 16 are fulcrumed (one at each of the corner-posts 14 14 of the dipping-frame) at their lower ends upon bolts 17 17, passed through the side bars 5 5, posts 14 14, and bracket-pieces 18 18. These bolts (one of which is shown in detail in Fig. 6) are screw-threaded to take into such bracket-pieces, and each carries a spring 19, coiled thereon, having one end bearing upon the inside face of the end piece 6 adjacent thereto and its other end bearing upon the latch and exerting a pressure tending to cause it to normally stand vertical and with its upper shoulder extending over one end bar of the cover-frame.

The tray that I prefer to use to receive the completed drops consists of a rectangular plate 20, corresponding in size to the dipping-frame, but with its corners cut away, as at 20ᵃ, to accommodate the corner-posts 13 13 14 14.

The trough 21, in which the coating substance is contained and in which the filled dipping-frame is dipped, is preferably of oblong form slightly longer and wider than the carrier and set in a table 22. This table also carries a frame 23 23, perforated, as at 23ᵃ 23ᵃ, to receive the lower ends or legs of the posts 13 13 14 14 of the dipping-frame, and this frame is agitated through any desired means (not shown) by either hand or steam power.

In the use of my apparatus a drop or other article to be coated is placed in each of the holders of the dipping-frame, the drops being preferably placed with their apices downward and their sides resting upon the curved ends of the pieces. The cover is then placed upon the dipping-frame and set with one of its transverse end frame-bars in the recesses 13ᵇ 13ᵇ of posts 13 13, the forward end being then pressed down over the latches 16 16, which will through the action of springs 19 19 automatically give way and return to their normal position, thus allowing the transverse bar of such forward end of the cover to be located beneath the shoulders of such latches. The dipping-frame with the cover held thereon is then lifted by handles 25 25 (carried by the dipping-frame) and the whole immersed in the coating material contained in the trough 21, after which the dipping-frame is set with its legs 13 13 14 14 taking in the openings in the agitator-frame, which is then agitated by any desirable and well-known means, (not shown,) thus shaking any superfluous coating material from the drops back into the trough again. After the agitation the cover is removed (the latches 16 16 being first pressed back against their springs to allow of such removal) and the tray is substituted therefor, after which the dipping-frame can be lifted from the agitator-frames and turned upside down, (the tray meanwhile being held in place by hand,) when the coated articles will be deposited upon the tray, thus emptying the dipping-frame, when the foregoing can be repeated.

It will be preferable to spread a sheet of paper, preferably of a size equal to the tray, over the coated articles before such tray is placed thereon, in order when the dipping-frame is removed from the agitator-frame and reversed that the coated article will be deposited upon such sheet of paper instead of the tray.

It will be obvious that various parts can be changed or varied without departing from the spirit of my invention, as, for instance, the contacts, although of similar construction, can be set cornerwise of the holders in the carrier or a less number used and be equally effective.

What I claim is as follows:

1. In combination with the dipping-frame of a coating apparatus, such dipping-frame being formed of a rectangular frame having longitudinal and transverse bars disposed to provide subdivisions or open spaces throughout the frame, a series of supports formed in pairs each pair of a separate piece of curved wire having its ends bent toward each other and such supports being carried by the longitudinal and transverse bars of such frame, so that one support of a pair will project on one side of a bar into one space and the other support of such pair, into another space, for the purpose set forth.

2. In coating apparatus, a dipping-frame provided with corner-posts and holders to receive the articles to be coated, a cover for such dipping-frame, adapted to receive such corner-posts and means for detachably connecting said cover to said corner-posts, for the purpose set forth.

3. In coating apparatus, a dipping-frame adapted to receive and support the articles to be coated, and provided with posts at the corners thereof, two of which posts are recessed to receive one end of a cover, the other two posts being each provided with a shoulder to receive the other end of such cover thereon and means carried by said last-mentioned posts for detachably retaining such cover against displacement for the purpose set forth.

4. In coating apparatus, a dipping-frame, adapted to receive and support the articles to be coated, and provided with posts at the corners thereof, two of which posts are recessed to receive one end of a cover, the other two posts being each provided with a shoulder to receive the other end of such cover thereon, and a spring-operated latch carried by each of said last-mentioned posts, for detachably retaining such cover against displacement, for the purpose set forth.

5. In coating apparatus, a rectangular dipping-frame adapted to receive and support the articles to be coated, and provided with posts at the corners thereof, two of which posts are recessed to receive one end of a cover, the other two posts being each provided with a shoulder to receive the other end of such cover thereon, a bracket-piece carried by the end frame-bar of said dipping-frame in close proximity to each of such last-mentioned posts, a bolt carried between each bracket-piece and the side frame-bar adjacent thereof of the dipping-frame, a latch pivoted upon each of said bolts and provided with a shoulder adapted to engage the end of the cover, and a coiled spring carried by said bolt, having one end bearing against the end frame-bar of the dipping-frame and its other end bearing against said latch to keep same normally in a position to engage the end of said cover, for the purpose set forth.

6. In coating apparatus, a dipping-frame having a number of holders each composed of a number of supports carried by such frame and extending partially across openings therein and having their ends rounded, adapted to receive and support the articles to be coated; and such frame being provided with posts at the corners thereof, two of which posts are recessed to receive one end of a cover, the other two posts being each provided with a shoulder to receive the other end of such cover thereon, and means, carried by said last-mentioned posts, for detachably retaining such cover against displacement, for the purpose set forth.

7. In coating apparatus, a dipping-frame, having a number of holders each composed of a number of supports carried by such frame and extending partially therein and having their ends rounded, adapted to receive and support the articles to be coated; and such frame being provided with posts at the corners thereof, two of which posts are recessed to receive one end of a cover, the other two posts being each provided with a shoulder to receive the other end of such cover thereon and a spring-operated latch carried by each of said last-mentioned posts, for detachably retaining such cover against displacement, for the purpose set forth.

8. In coating apparatus, a rectangular dipping-frame having a number of holders each composed of a number of supports carried by such frame and extending partially across openings therein and having their ends rounded, adapted to receive and support the articles to be coated, and such frame being provided with posts at the corners thereof, two of which posts are recessed to receive one end of a cover, the other two posts being each provided with a shoulder to receive the other end of such cover thereon, a bracket-piece carried by the end frame-bar of said dipping-frame in close proximity to each of such last-mentioned posts, a bolt carried between each bracket-piece and the side frame-bar adjacent thereto of the dipping-frame, a latch pivoted upon each of said bolts and provided with a shoulder adapted to engage the end of the cover, and a coiled spring carried by said bolt, having one end bearing against the end frame-bar of the dipping-frame and its other end bearing against said latch to keep same normally in a position to engage the end of said cover, for the purpose set forth.

9. In coating apparatus, a rectangular dipping-frame having longitudinal and transverse bars disposed to provide subdivisions or holders throughout the frame, a series of supports formed in pairs, each pair of a separate piece of curved wire having its ends bent toward each other and such support being carried by the longitudinal and transverse bars of such frame, so that one support of a pair will project on one side of a bar into one space and the other support of such pair into another space, and such frame being provided with posts coated at the corners thereof and having their lower ends extending below such dipping-frame, two of such posts are recessed to receive one end of a cover, the body portion of which is formed with bars adapted when placed upon such dipping-frame, to coincide with the centers of the holders thereof, the other two posts being each provided with a shoulder to receive the other end of such cover thereon, a bracket-piece carried by the end frame-bar of said dipping-frame in close proximity to each of such last-mentioned posts, a bolt carried between each bracket-piece and the side frame-bar adjacent thereto of the dipping-frame, a latch pivoted upon each of said bolts and provided with a shoulder adapted to engage the end of the cover, and a coiled spring carried by said bolt, having one end bearing against the end frame-bar of the dipping-frame and its other end bearing against said latch to keep same normally in a position to engage the end of said cover, for the purpose set forth.

Montreal, November 8, 1895.

CHARLES THEODORE VIAU.

In presence of—
  FRED. J. SEARS,
  RUPT. C. KIMBER.